Aug. 25, 1953

S. M. COOPER 2,650,141

LOCKING COLLAR

Filed June 21, 1950

STANLEY M. COOPER Inventor

By Mitchell Bechert

Attorneys

Patented Aug. 25, 1953

2,650,141

UNITED STATES PATENT OFFICE 2,650,141

LOCKING COLLAR

Stanley Miller Cooper, New Britain, Conn., assignor to The Fafnir Bearing Company, New Britain, Conn., a corporation of Connecticut Application June 21, 1950, Serial No. 169,457

9 Claims. (Cl. 308—236)

1

My invention relates to locking means for securing an inner bearing ring or the life to a shaft.

It is an object of the invention to provide improved means of the character indicated.

It is another object to provide an improved locking means involving a minimum of additional axial length to an assembled bearing or the like.

It is a further object to provide an improved locking means of sheet material for the purpose indicated and including means inherently urging the locking means axially tightly against a secured bearing ring.

It is a further object to provide improved locking means of the character indicated which may also serve to promote the sealing effectiveness of the bearing which it secures to a shaft.

Other objects and various further features of novelty and invention will be pointed out or will occur to those skilled in the art from a reading of the following specification in conjunction with the accompanying drawings. In said drawings, which show, for illustrative purposes only, preferred forms of the invention;

Briefly stated, my invention contemplates a relatively simple locking ring to engage an eccentric counterbore in one end of an antifriction bearing or the like to be secured to a shaft. The locking means may be an annular disc of sheet material with an integral lug turned axially substantially at the bore of an annular disc. If the lug is of thickness intermediate the maximum and minimum radial clearances of the eccentric counterbore with respect to the shaft, then the lug may be squeezed between the counterbore and the shaft so as securely to lock the inner bearing ring to the shaft upon a relative rotation of the disc and of the inner bearing ring.

Figure 1:
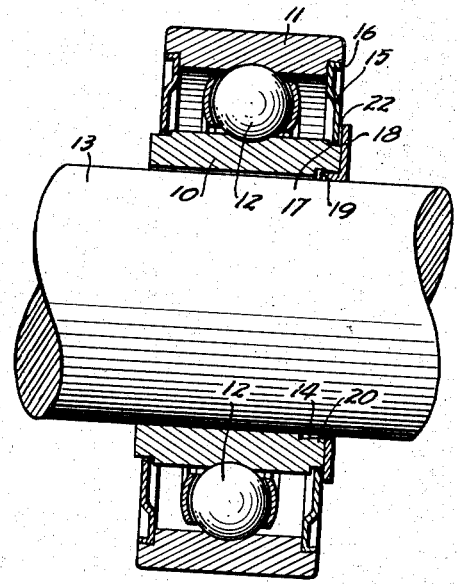
Fig. 1 is a longitudinal sectional view of an anti-friction bearing having an inner ring secured to a shaft by locking means of the invention.
Figure 2:
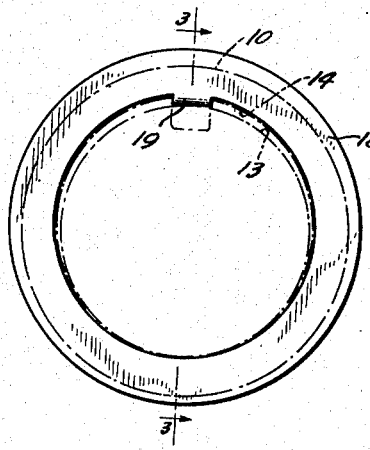
Fig. 2 is an end view of the locking means of Fig. 1.
Figures 3, 4:
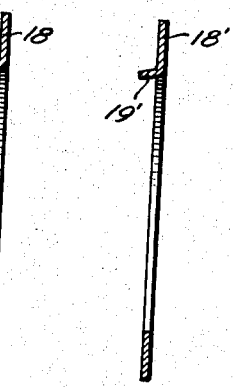
Fig. 3 is a sectional view in the plane 3—3 of Fig. 2.
Fig. 4 is a sectional view similar to the view of Fig. 3 but illustrating a slight modification.

Referring to Figs. 1 to 3 of the drawings, my invention is shown in application to an antifriction bearing including an inner bearing ring 10 and an outer ring 11, spaced for relative rotation by a plurality of antifriction elements 12. The bore of the inner bearing ring may accommodate a shaft 13, and an eccentric locking counterbore 14 may be provided at one axial end

2 of the inner bearing ring 10. The bearing may include seal means comprising an annular disc 15 carried by one of relatively rotatable members 10—11, and in the form shown the seal disc 15 is swaged or otherwise held in a counterbore at one end of the outer bearing ring 11, as at the flange 16. The seal means 15 may extend into close clearance relation with the bearing ring 10, and in the form shown the inner skirt of the seal ring 15 closely axially and radially clears a shoulder 17 at the counterbore end of the inner bearing ring 10. For reasons which will be pointed out, I prefer that at least at the inner skirt of the seal means 15, the said skirt shall axially inwardly clear the axial outer limit of the counterbore end of the inner bearing ring 10.

In accordance with the invention, I provide a novel and simple locking means to cooperate between the counterbore 14 and the shaft 13 to lock the inner bearing ring 10 to the shaft. Such means may be fabricated of flat sheet material, and I have employed an annular disc 18 of material thickness preferably intermediate the stated maximum and minimum radial clearances defined by the counterbore 14 with respect to the shaft 13. For locking purposes, the disc 18 may integrally be formed with a generally axially directed lug 19, and for appearance's sake I prefer that the lug 19 be bent substantially in line with the bore of the locking ring 18. It will be appreciated that with the stated relationship of the counterbore clearances and of the locking lug thickness (i. e. locking-ring thickness in the form shown), the lug 19 will inevitably be squeezed between the counterbore and the shaft upon relative rotation of the inner bearing ring 10 and of the locking ring 18.

I prefer that the locking counterbore 14 shall be formed with a taper or flare converging toward the counterbore end of the inner bearing ring 10. With such formation of the counterbore 14, it will be appreciated that the axial outer limit thereof, as at 20, may define a slightly radially inwardly and circumferentially extending projection or lip so as to engage the lug 19 substantially locally and near the bend thereof. In setting up a binding engagement there will necessarily be an elastic deformation of the squeezed parts, and this deformation may be such as to slightly radially inwardly displace the bent end of the lug 19 with respect to the free or axially projecting end of the lug 19. This difference in displacement of the ends of the lug 19 may cause a slight tilting of the lug 19 in a clockwise direction (in the sense of Fig. 1), with resultant tendency angularly to displace the entire body of the ring 18 in a clockwise sense. Of course, if the entire body of the ring 18 is already in abutment with the end of the inner bearing ring 10, then the tendency to tilt the lug 19 may not cause a tilting displacement of the ring 18 but merely a resilient stressing of the ring 18, so as to cause the ring 18 to lie firmly against the inner bearing ring 10 and in stressed condition. It will be appreciated that in such stressed condition the ring 18 may be held in non-chattering relation with the bearing even though loads sustained by the bearing or by the shaft may be vibrating loads.

In certain cases, it may prove insufficient to rely upon the tendency to tilt the lug 19 from the purely axially directed position in which it is originally formed, and additional stressing of the bend of lug 19 may be desired. In such event, I prefer to form the lug as shown in the case of lug 19' on ring 18' in Fig. 4. This formation is characterized by a slight radially inward tilting of the lug 19' so that the lug 19' may be said to project generally axially and radially inwardly. It will be appreciated that in locking the ring 18' in a counterbore, as at 14, the lug 19' will be caused to bend or flex to a greater extent so that the main body of the ring 18' may be loaded resiliently against the end of the inner bearing ring 10 to a greater extent than that previously described.

Figure 5:
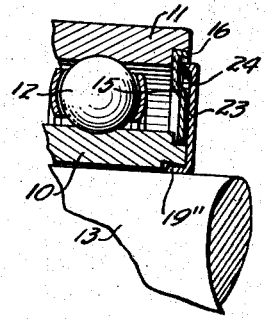
Fig. 5 is a fragmentary longitudinal sectional view of a bearing locked on a shaft with a further modified construction.

The maximum radial extent of the main body of the locking ring 18 is of no particular importance so far as concerns its locking function. However, the construction lends itself to combined locking and flinger functions. In Fig. 1, the radially outer limit of the ring 18 exceeds the radially inner limit of the seal means 15, and because of the described axial clearance of the seal means 15 with respect to the locking end of the inner bearing ring 10, there may be provided between the locking ring 18 and the seal means 15 a further sealing passage, as at 22. If desired for further flinging and sealing effectiveness, the radially outer limit of the locking disc may be even further extended, and in Fig. 5 I show a locking means 23 extending into close clearance relation with the outer bearing ring 11. If desired, an axially inward flange 24 may be formed upon the disc 23, and in the form shown this flange 24 extends axially inwardly of the mounting flange 16 of the seal means 15.

It will be appreciated that I have described an improved locking means for securing an inner bearing ring or the like to a shaft. My locking means is simple to make, to install, and to operate, and its use results in almost negligible additional axial length to a bearing assembly. The construction may be rattleproof and may cooperate with other bearing parts in improving the sealing effectiveness of the bearing.

While I have described my invention in detail for the preferred forms shown, it will be understood that modifications may be made within the scope of the invention as defined in the appended claims.

I claim:

1. In combination, an inner bearing ring having a bore for mounting upon a shaft with an eccentric locking counterbore at one end, and a locking ring comprising annular means to fit over the shaft and against said end and integrally including a generally axially projecting lug substantially at the bore thereof for reception in said counterbore, whereby upon relative rotation of said inner ring and of said annular means said lug may be squeezed between said counterbore and the shaft so as securely to bind said inner ring upon the shaft.

2. A combination according to claim 1, in which the radial thickness of said lug exceeds the minimum radial clearance of said counterbore with the shaft.

3. A combination according to claim 1, in which said inner bearing ring is assembled with an outer bearing ring and in which said annular means extends radially outwardly into close clearance relation with said outer bearing ring, for the purpose described.

4. In combination, a bearing including relatively rotatable inner and outer rings, the inner of said rings having a bore to be mounted upon a shaft and an eccentric counterbore at one axial end, said rings being axially retained with respect to each other, seal means carried by one of said rings and extending radially into sealing cooperation with the other of said rings, said seal means including a part disposed just axially inside the outer axial limit at the counterbore end of said inner ring, and locking means including an annular radially extending disc in abutment with said counterbore-end and including a part in radial overlapping relation with said part of said seal means.

5. A combination according to claim 4, in which said overlapping part of said disc extends radially outwardly into close clearance relation with the outer of said rings.

6. A combination according to claim 4, in which said seal means is carried by the outer of said rings.

7. In combination, ring means having a bore to be mounted upon a shaft and having at one axial end an eccentric locking counterbore defining a minimum radial clearance with the shaft, and a maximum radial clearance with the shaft, said clearances being angularly spaced with respect to each other about the axis of said bore, and a locking ring of sheet material of thickness intermediate the extent of said radial clearances, said ring having an axially directed lug to be axially inserted in said counterbore near said maximum clearance and to be squeezed between said counterbore and the shaft at a point angularly remote from said point of maximum clearance and in the direction of said minimum clearance.

8. A combination according to claim 7, in which said lug is sloped axially and radially inwardly from the bore of said locking ring, thereby causing the radially inward limit of the projected end of said lug to be radially inwardly disposed relatively to the bend of said lug, whereby, upon relative rotation of said locking ring and of said inner bearing ring, said lug may be caused to deform in a further-axially-projecting direction, thereby stressing said locking ring at the bend of said lug, said stressing being in a direction resiliently to load substantially one entire end face of said locking ring against the counterbored end of said inner bearing ring.

9. A combination according to claim 7, in which said counterbore is formed with a generally converging taper, and in which said maximum and minimum radial clearances with the shaft are defined substantially at the end face of said inner bearing ring.

STANLEY MILLER COOPER.

References Cited in the file of this patent
UNITED STATES PATENTS

| Number | Name | Date |
| --- | --- | --- |
| 1,304,575 | Kohlmyer | May 27, 1919 |
| 1,531,468 | Whitney | Mar. 31, 1925 |
| 1,788,116 | Lund | Jan. 6, 1931 |